United States Patent [19]
Morris, III

[11] Patent Number: 5,915,124
[45] Date of Patent: Jun. 22, 1999

[54] METHOD AND APPARATUS FOR A FIRST DEVICE ACCESSING COMPUTER MEMORY AND A SECOND DEVICE DETECTING THE ACCESS AND RESPONDING BY PERFORMING SEQUENCE OF ACTIONS

[75] Inventor: George Lockhart Morris, III, Escondido, Calif.

[73] Assignee: NCR Corporation, Dayton, Ohio

[21] Appl. No.: 08/778,938

[22] Filed: Jan. 3, 1997

[51] Int. Cl.$^6$ ................................................ G06F 13/00
[52] U.S. Cl. ........................ 395/829; 395/826; 395/836; 395/856; 711/146
[58] Field of Search ........................... 370/218; 395/520, 395/872, 828, 847, 836, 842, 829, 473; 707/201; 364/578, 528.21

[56] References Cited

U.S. PATENT DOCUMENTS

| | | | |
|---|---|---|---|
| 4,725,971 | 2/1988 | Doshi et al. ........................... | 364/578 |
| 4,807,224 | 2/1989 | Naron et al. .......................... | 370/218 |
| 5,170,470 | 12/1992 | Pindar et al. ......................... | 395/828 |
| 5,247,650 | 9/1993 | Judd et al. ............................ | 395/500 |
| 5,426,737 | 6/1995 | Jacobs .................................. | 395/847 |
| 5,479,654 | 12/1995 | Squibb ................................. | 707/201 |
| 5,649,230 | 7/1997 | Lentz ................................... | 395/872 |
| 5,710,712 | 1/1998 | Labun .............................. | 364/528.21 |
| 5,732,283 | 3/1998 | Rose et al. ........................... | 395/836 |
| 5,765,022 | 6/1998 | Kaiser et al. ........................ | 395/842 |

*Primary Examiner*—Thomas C. Lee
*Assistant Examiner*—Michael G. Smith
*Attorney, Agent, or Firm*—Gates & Cooper

[57] ABSTRACT

A method of controlling an input/output (I/O) device connected to a computer to facilitate fast I/O data transfers. An address space for the I/O device is created in the virtual memory of the computer, wherein the address space comprises virtual registers that are used to directly control the I/O device. In essence, control registers and/or memory of the I/O devices are mapped into the virtual address space, and the virtual address space is backed by control registers and/or memory on the I/O device. Thereafter, the I/O device detects writes to the address space. As a result, a pre-defined sequence of actions can be triggered in the I/O device by programming specified values into the data written into the mapped virtual address space.

27 Claims, 8 Drawing Sheets

FIG. 6

| HEX | DEC | | 602 | | |
|---|---|---|---|---|---|
| 0 | 0 | ETHERNET HEADER (14 BYTES) | 01 | TARGET ETHERNET ADDRESS (6 BYTES) | |
| 1 | 1 | | 02 | | |
| 2 | 2 | | 03 | | |
| 3 | 3 | | 04 | | |
| 4 | 4 | | 05 | | |
| 5 | 5 | | 06 | | |
| 6 | 6 | 604 | 07 | SOURCE ETHERNET ADDRESS (6 BYTES) | |
| 7 | 7 | | 08 | | |
| 8 | 8 | | 09 | | |
| 9 | 9 | | 0a | | |
| a | 10 | | 0b | | |
| b | 11 | | 0c | | |
| c | 12 | | 08 | PROTOCOL TYPE (0x0800 = IP) | |
| d | 13 | | 00 | | |
| e | 14 | IP HEADER (20 BYTES) | 45 | VERSION = 4, IP HEADER LEN (WORDS) = 5 | |
| f | 15 | | 00 | SERVICE TYPE | |
| 10 | 16 | | 00 | TOTAL LENGTH = 0x001d (29 BYTES: 20 – BYTE IP HEADER PLUS 8 – BYTE UDP HEADER PLUS 1 – BYTE USER DATA) | |
| 11 | 17 | | 1d | | |
| 12 | 18 | | e0 | DATAGRAM Id = 0xe0a1 | |
| 13 | 19 | | a1 | | |
| 14 | 20 | | 40 | FLAG 0x4 DO_NOT_FRAGMENT | |
| 15 | 21 | | 00 | FRAGMENT OFFSET = 0x000 | |
| 16 | 22 | | 40 | TIME – TO – LIVE = 0x40 | |
| 17 | 23 | 606 | 11 | IP PROTOCOL = 0x11 (UDP) | |
| 18 | 24 | | da | IP HEADER CHECKSUM = 0xda1b | |
| 19 | 25 | | 1b | | |
| 1a | 26 | | 80 | IP ADDRESS OF SOURCE = 128.1.192.7 | |
| 1b | 27 | | 01 | | |
| 1c | 28 | | c0 | | |
| 1d | 29 | | 07 | | |
| 1e | 30 | | 80 | IP ADDRESS OF DESTINATION = 128.1.192.8 | |
| 1f | 31 | | 01 | | |
| 20 | 32 | | c0 | | |
| 21 | 33 | | 08 | | |
| 22 | 34 | UDP HEADER (8 BYTES) | 00 | SOURCE PORT = 0x0007 (ECHO DATAGRAM) | |
| 23 | 35 | | 07 | | |
| 24 | 36 | | 30 | DESTINATION PORT = 0x3018 | |
| 25 | 37 | 608 | 18 | | |
| 26 | 38 | | 00 | UDP LENGTH = 0x0009 (8 – BYTE UDP HEADER PLUS 1 – BYTE USER DATA) | |
| 27 | 39 | | 09 | | |
| 28 | 40 | | 0c | UDP CHECKSUM = 0x0cf8 | |
| 29 | 41 | | f8 | | |
| 2a | 42 | USER DATA (VARIABLE) | 67 | 1 BYTE USER DATAGRAM = "g" | |
| | | 610 | | | |

FIG. 7

| HEX | DEC | | | |
|---|---|---|---|---|
| 0 | 0 | ETHERNET HEADER (14 BYTES) | 01 | TARGET ETHERNET ADDRESS (6 BYTES) |
| 1 | 1 | | 02 | |
| 2 | 2 | | 03 | |
| 3 | 3 | | 04 | |
| 4 | 4 | | 05 | |
| 5 | 5 | | 06 | |
| 6 | 6 | | 07 | SOURCE ETHERNET ADDRESS (6 BYTES) |
| 7 | 7 | | 08 | |
| 8 | 8 | | 09 | |
| 9 | 9 | | 0a | |
| a | 10 | | 0b | |
| b | 11 | | 0c | |
| c | 12 | | 08 | PROTOCOL TYPE (0x0800 = IP) |
| d | 13 | | 00 | |
| e | 14 | IP HEADER (20 BYTES) | 45 | VERSION = 4, IP HEADER LEN (WORDS) = 5 |
| f | 15 | | 00 | SERVICE TYPE |
| 10 | 16 | | | TOTAL LENGTH |
| 11 | 17 | | | |
| 12 | 18 | | | DATAGRAM Id |
| 13 | 19 | | | |
| 14 | 20 | | 40 | FLAG 0x4 DO_NOT_FRAGMENT |
| 15 | 21 | | 00 | FRAGMENT OFFSET = 0x000 |
| 16 | 22 | | 40 | TIME – TO – LIVE = 0x40 |
| 17 | 23 | | 11 | IP PROTOCOL = 0x11 (UDP) |
| 18 | 24 | | | IP HEADER CHECKSUM |
| 19 | 25 | | | |
| 1a | 26 | | 80 | IP ADDRESS OF SOURCE = 128.1.192.7 |
| 1b | 27 | | 01 | |
| 1c | 28 | | c0 | |
| 1d | 29 | | 07 | |
| 1e | 30 | | 80 | IP ADDRESS OF DESTINATION = 128.1.192.8 |
| 1f | 31 | | 01 | |
| 20 | 32 | | c0 | |
| 21 | 33 | | 08 | |
| 22 | 34 | UDP HEADER (8 BYTES) | 00 | SOURCE PORT = 0x0007 (ECHO DATAGRAM) |
| 23 | 35 | | 07 | |
| 24 | 36 | | 30 | DESTINATION PORT = 0x3018 |
| 25 | 37 | | 18 | |
| 26 | 38 | | | UDP LENGTH |
| 27 | 39 | | | |
| 28 | 40 | | | UDP CHECKSUM |
| 29 | 41 | | | |

METHOD AND APPARATUS FOR A FIRST DEVICE ACCESSING COMPUTER MEMORY AND A SECOND DEVICE DETECTING THE ACCESS AND RESPONDING BY PERFORMING SEQUENCE OF ACTIONS

CROSS-REFERENCE TO PARENT APPLICATION

This application is related to and commonly assigned U.S. patent application Ser. No. 08/577,678, filed Dec. 21, 1995, now U.S. Pat. No. 5,768,618 dated Dec. 1, 1998, by G. Erickson et al., entitled "DIRECT PROGRAMMED I/O DEVICE CONTROL METHOD USING VIRTUAL REGISTERS", and which application is incorporated by reference herein.

BACKGROUND OF THE INVENTION

1. Field of the Invention

This invention relates in general to computer input/output (I/O) device interfaces, and in particular, to a method of using virtual registers to directly control an I/O device adapter to facilitate fast data transfers.

2. Description of Related Art

Modern computer systems are capable of running multiple software tasks or processes simultaneously. In order to send information to a software process or receive information from a software process, an input/output (I/O) device interface is typically used. An I/O device interface provides a standardized way of sending and receiving information, and hides the physical characteristics of the actual I/O device from the software process. Software processes which use I/O device interfaces are typically easier to program and are easier to implement across multiple types of computers because they do not require knowledge or support for specific physical I/O devices.

An I/O device interface is typically implemented by a software program called an I/O device driver. The I/O device driver must take information coming from an external source, such as a local area network, and pass it along to the appropriate software process. Incoming data is frequently buffered into a temporary storage location in the device driver's virtual address space (VAS), where it subsequently copied to the VAS of the user process during a separate step.

However, as recent advances in communication technology have rapidly increased the bandwidth of many I/O devices, the copying step from the device I/O driver's VAS to the user process' VAS represents a potential bottleneck. For instance, the bandwidth for fiber optic link lines is now typically measured in gigabits per second. This tremendous bandwidth creates a problem when information is copied within the computer. When information is copied, all data passes through the computer processor, memory, and internal data bus several times. Therefore, each of these components represents a potential bottleneck which will limit the ability to use the complete communications bandwidth. I/O latency and bandwidth are impaired by this standard programming paradigm utilizing intermediate copying.

In addition, programming an I/O device driver usually involves a user process making an operating system call, which involves a context switch from the user process to the operating system. This context switch further inhibits the ability of computer systems to handle a high I/O data bandwidth.

Therefore, there is a need for multiple user processes in a single computing node to be able to simultaneously share direct access to an I/O device without intervention of the operating system on a per I/O basis.

SUMMARY OF THE INVENTION

To overcome the limitations in the prior art described above, and to overcome other limitations that will become apparent upon reading and understanding the present specification, the present invention discloses a "Shared Virtual Hardware" technique that provides the capability for multiple user processes in a single computing node to simultaneously share direct access to an I/O device containing "Virtual Hardware" functionality without operating system intervention.

The Virtual Hardware functionality, which is described in the co-pending application cited above, is a method of controlling an input/output (I/O) device connected to a computer to facilitate fast I/O data transfers. An address space for the I/O device is created in the virtual memory of the computer, wherein the address space comprises virtual registers that are used to directly control the I/O device. In essence, control registers and/or memory of the I/O device are mapped into the virtual address space, and the virtual address space is backed by control registers and/or memory on the I/O device. Thereafter, the I/O device detects writes to the address space. As a result, a predefined sequence of actions can be triggered in the I/O device by programming specified values into the data written into the mapped virtual address space.

The Shared Virtual Hardware technique of the present invention extends the Virtual Hardware technique by incorporating additional capability into the Virtual Hardware in order to share its functionality with peer devices. Therefore, Shared Virtual Hardware enables significant performance enhancements to I/O devices which do not contain the Virtual Hardware functionality.

User processes interacting with standard, off-the-shelf devices may benefit from the Virtual Hardware technique. In addition, the system bandwidth requirements for the control of the off-the-shelf device may be reduced as the controlling element moves closer in proximity to the device in multi-tiered bus structures (from host processor to peer level processor).

BRIEF DESCRIPTION OF THE DRAWINGS

FIG. 6 is a block diagram illustrating a typical Ethernet-based UDP datagram sent by a user process;

FIG. 7 is a block diagram illustrating a UDP datagram header template in the I/O device adapter's memory.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Programming an input/output (I/O) device typically involves a user process making a call to the operating system. This involves a context switch that swaps information in system registers and memory in order to process incoming data. Further, in many environments, the routing of I/O data also entails one or more memory-to-memory copies of the data before the physical I/O occurs on the actual device. It will be recognized that I/O latency and bandwidth are impaired by invoking the operating system through the use of an exception handler, as well as by performing multiple memory-to-memory copies of the data.

The Virtual Hardware technique, described in co-pending and commonly assigned U.S. patent application Ser. No. 08/577,678, filed Dec. 21, 1995, by G. Erickson et al., entitled "DIRECT PROGRAMMED I/O DEVICE CONTROL METHOD USING VIRTUAL REGISTERS", and attorney's docket number 6368, which application is incorporated by reference herein, provides the capability for multiple user processes in a single computing node to simultaneously share direct access to an I/O device without the intervention of the operating system for each data transfer as it occurs. The present invention extends this technique by describing how a device containing Virtual Hardware functionality can be modified to include Shared Virtual Hardware functionality to create the most efficient method to transfer directly between the user process and off-the-shelf devices resident on the same node.

Hardware Environment

Figure 1:
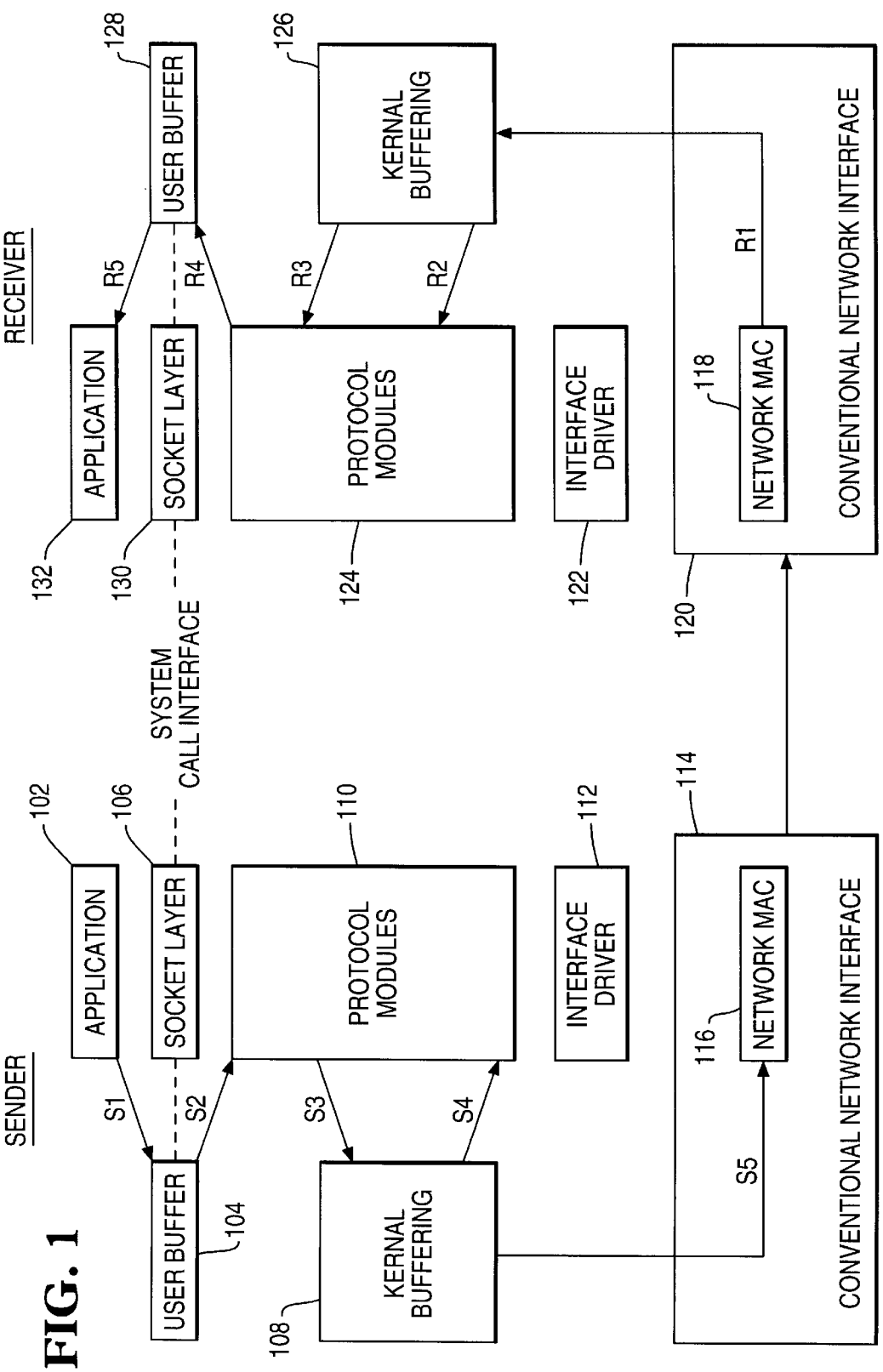
FIG. 1 is a flow diagram illustrating a conventional I/O data flow between a sender and a receiver.

FIG. 1 is a flow diagram illustrating a conventional I/O data flow between a sender and a receiver. At 102, a sender application sends data across a memory bus to a user buffer 104 via socket layer 106. The data is subsequently buffered through the operating system kernel 108 by the protocol modules 110, before it is sent out by the interface driver 112 through conventional network interface 114 to the network media access control (MAC) 116. It will be noted that in this system model, the data makes at least three trips across the memory bus at S2, S3 and S5.

For the receiving application, the steps are reversed from those of the sender application. The data is received via the network media access control (MAC) 118 into conventional network interface 120. The interface driver 122 and protocol modules 124 buffer the data through the operating system kernel 126. The protocol modules 124 then send the data to user buffer 128, where it may be accessed by socket layer 130 or receiver application 132. It will be noted that in this system model, the data makes at least three trips across the memory bus at R1, R2, and R4.

Virtual Hardware Memory Organization

Figure 2:
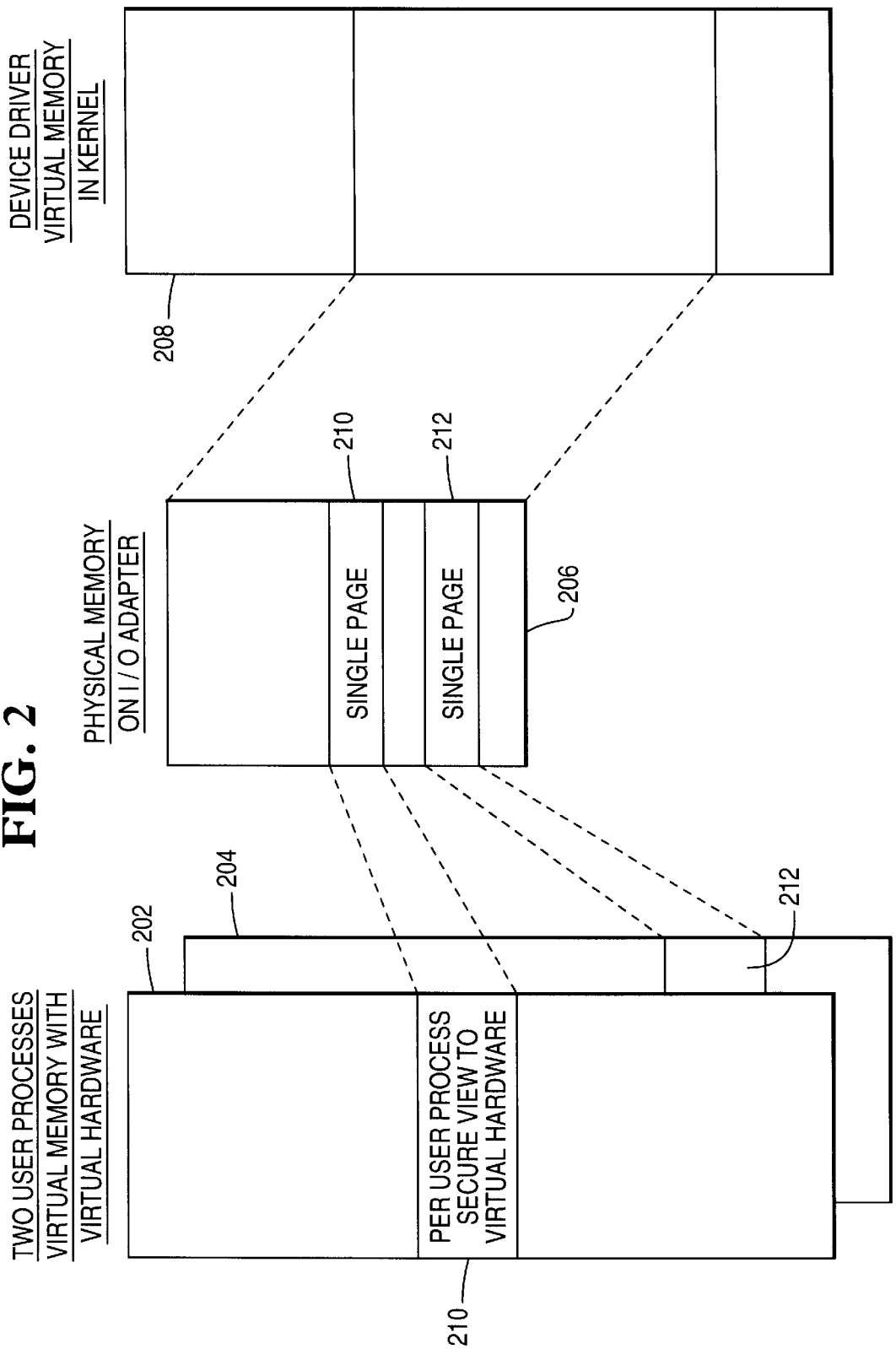
FIG. 2 is a block diagram illustrating a Virtual Hardware memory organization compatible with the present invention.

FIG. 2 is a block diagram illustrating a Virtual Hardware memory organization. I/O device adapters on standard I/O buses, such as ISA, EISA, MCA, or PCI buses, frequently have some amount of memory and memory-mapped registers which are addressable from a device driver in the operating system. User processes 202, 204 cause I/O operations by making a request of the operating system which transfers control to the device driver. The sharing of a single I/O device adapter by multiple user processes is managed by the device driver running in the kernel, which also provides security.

The Virtual Hardware technique maps a portion of memory 206 physically located on the I/O device adapter into a device driver's address space 208. The Virtual Hardware technique also maps sub-portions, e.g., pages, 210, 212, of the I/O device adapter's memory 206 into the address spaces for one or more user processes 202, 204, thereby allowing the user processes 202, 204 to directly program the I/O device adapter without the overhead of the operating system, including context switches. Those skilled in the art will recognize that the sub-portions 210, 212 may be mapped directly from the I/O device adapter's memory 206, or that the sub-portions 210, 212 may be mapped indirectly from the I/O device adapter's memory 206 through the device driver's address space 208.

The I/O device adapter subsequently snoops the virtual address space 210, 212 to detect any reads or writes. If a read or write is detected, the I/O device adapter performs a specific predefined script of actions, frequently resulting in an I/O operation being performed directly between the user process' address space 202, 204 and the I/O device adapter. The user process triggers the execution of the script by setting or "spanking" the I/O control registers in 210, 212, which in turn causes the execution of the script.

The memory mapping must be typically performed in increments of the page size for the particular system or environment. Allocating memory in increments of the page size allows each user process to have a Virtual Hardware space 210, 212 that is secure from all other processes which might be sharing the same I/O device adapter. This security between user processes is maintained by the operating system in conjunction with virtual memory capabilities offered by most processors.

Each user process creates a memory mapping by performing an operating system request to open the I/O device adapter for access. Having the operating system create the virtual memory address space allows the operating system and I/O device driver to grant only very specific capabilities to the individual user process.

A script is prepared by the operating system for the I/O device adapter to execute each time the specific user process programs its specific Virtual Hardware. The user process is given a virtual address in the user process' address space that allows the user process very specific access capabilities to the I/O device adapter.

Virtual Hardware is also referred to as virtual registers. Virtual registers are frequently used to describe the view which a single user process has of the addressable registers of a given I/O device adapter.

Maintaining security between multiple software processes is important when sharing a single I/O device adapter. If the I/O device adapter controls a network interface, such as an Ethernet device, then the access rights granted to the user process by the operating system could be analogous to a Transmission Control Protocol (TCP) address or socket.

A TCP socket is defined by a communications transport layer and defines a set of memory addresses through which communication occurs. These transport addresses form a network-wide name space that allows processes to communicate with each other. A discussion of the form and structure of TCP sockets and packets, which are well-known within the art, may be found in many references, including *Computer Networks* by Andrew S. Tanenbaum, Prentice-Hall, New Jersey, 1981, pp. 326–327, 373–377, which is incorporated by reference herein.

Typically, the only capability to which the user process can get direct access is to send and receive bytes over a specified socket or transport address range. The user process is not necessarily given permission to emit any arbitrary packet on the media (e.g., an Ethernet network). It will be recognized by those skilled in the art that the Virtual Hardware technique applies not only to Ethernet or other interconnect communication devices, but also to almost any I/O device adapter in use by a multi-user operating system.

Flow Diagram

Figure 3:
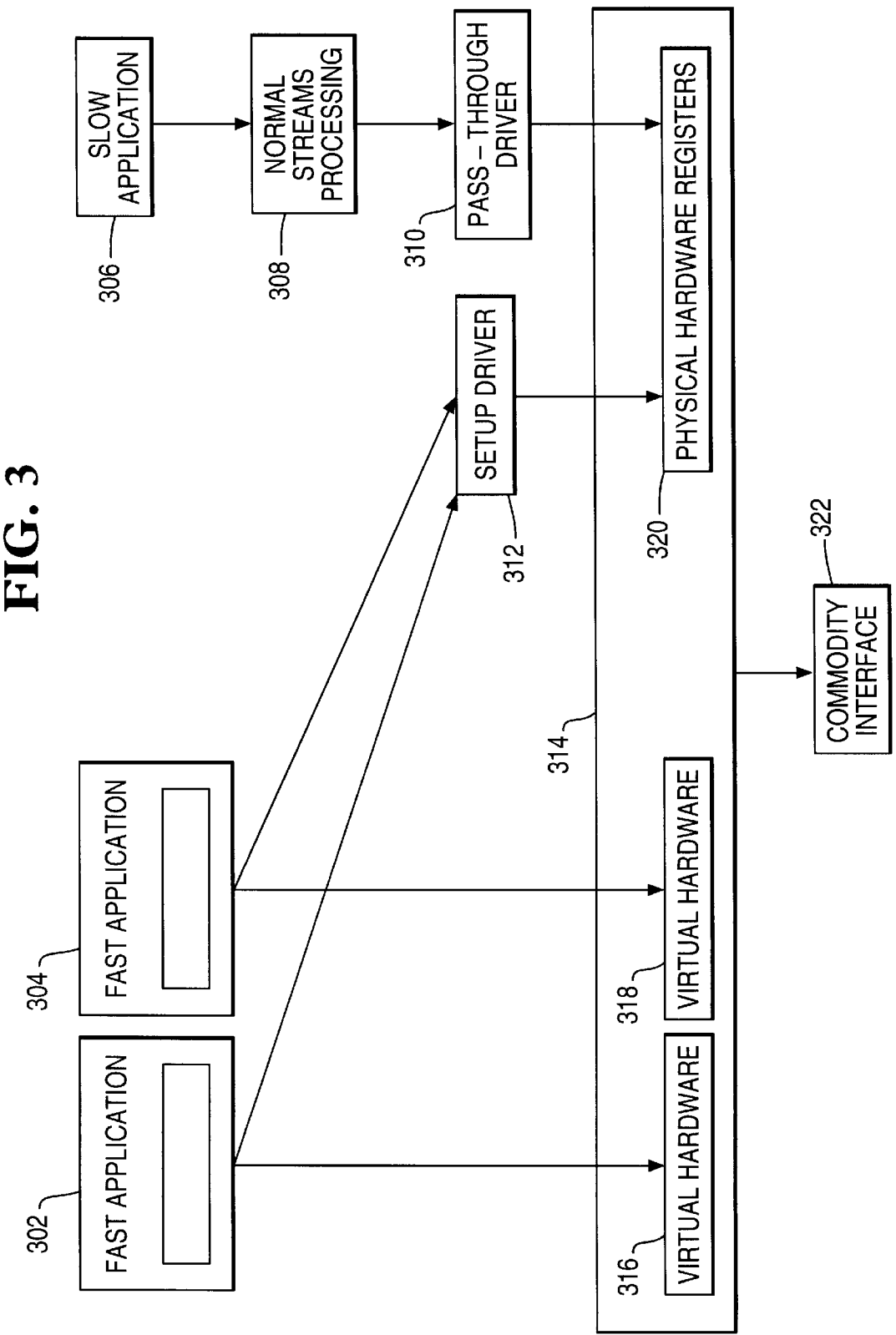
FIG. 3 is a flow diagram describing the system data flow of fast and slow applications compatible with the present invention.

FIG. 3 is a flow diagram describing the system data flow of fast and slow applications 302, 304, and 306 compatible with the Virtual Hardware technique. A traditional slow application 306 uses normal streams processing 308 to send data to a pass-through driver 310. The pass-through driver 310 initializes the physical hardware registers 320 of the I/O device adapter 314 to subsequently transfer the data through the I/O device adapter 314 to the commodity interface 322. With the Virtual Hardware technique, fast user applications 302 and 304 directly use a setup driver 312 to initialize the physical hardware registers 320, then send the data directly through the I/O device adapter 314 to the commodity interface 322 via Virtual Hardware 316 and 318. Thus, the overhead of the normal streams processing 308 and pass-through driver 310 are eliminated with the use of the Virtual Hardware 316 and 318, and fast applications 302 and 304 are able to send and receive data more quickly than slow application 306. As a result, the Virtual Hardware technique provides higher bandwidth, less latency, less system overhead, and shorter path lengths.

Direct Application Interface

Figure 4:
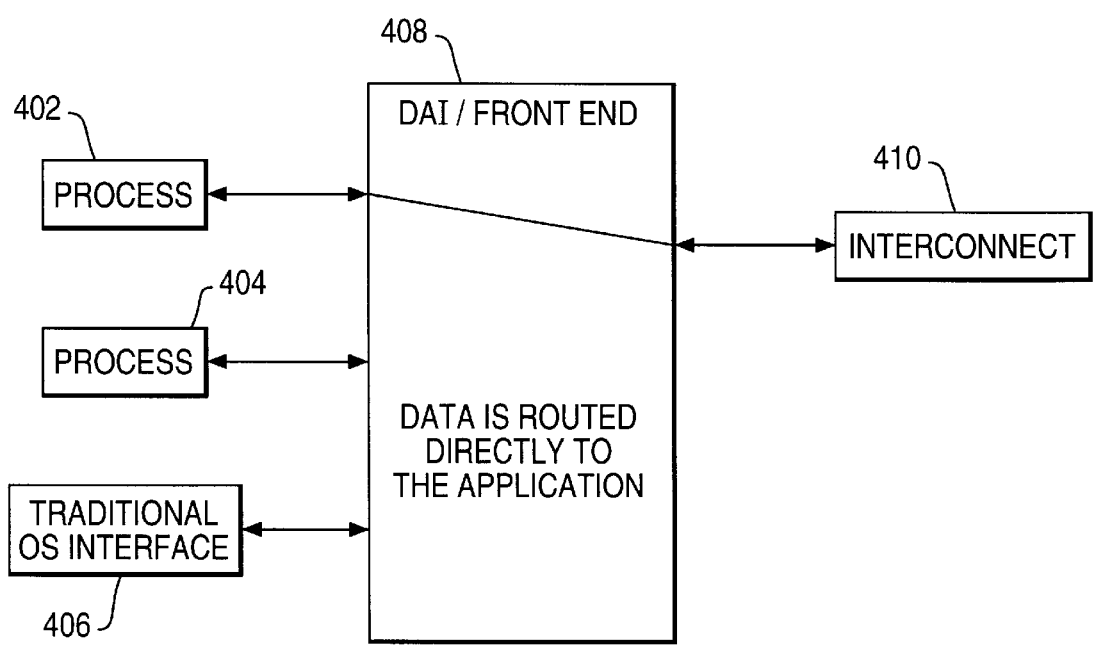
FIG. 4 is a block diagram describing direct application interface (DAI) and routing of data between processes and an external data connection which is compatible with the present invention.

FIG. 4 is a block diagram describing a direct application interface (DAI) and routing of data between processes and an external data connection which is compatible with the Virtual Hardware technique. Processes 402 and 404 transmit and receive data directly to and from an interconnect 410 (e.g., I/O device adapter) through the DAI interface 408. The data coming from the interconnect 410 is routed directly to a process 402 or 404 by use of Virtual Hardware and registers, rather than using a traditional operating system interface 406.

Conceptually, the Virtual Hardware technique may be thought of as providing each user process with its own I/O device adapter, which makes the user process and I/O device adapter logically visible to each other. The user process initiates a data transfer directly through a write to memory, thereby avoiding the overhead processing which would be incurred if the operating system were used to service the data transfer request. The user process determines the status of the data transfer through a memory read. The operating system and I/O device adapter remain free to allocate Virtual Hardware resources as needed, despite the presence of multiple user processes.

An I/O device adapter typically can have an arbitrary amount of random access memory (RAM) ranging from several hundred kilobytes to several megabytes, which may be used for mapping several user processes in a single communications node. Each user process that has access to the Virtual Hardware is typically assigned a page-sized area of physical memory on the I/O device adapter, which is then mapped into the virtual address space of the user process. The I/O device adapter typically is implemented with snooping logic to detect accesses within the page-sized range of memory on the I/O device adapter. If the I/O device adapter detects access to the physical memory page, a predefined script is then executed by the I/O device adapter in order to direct the data as appropriate.

Scripts typically serve two functions. The first function is to describe the protocol the software application is using. This includes but is not limited to how to locate an application endpoint, and how to fill in a protocol header template from the application specific data buffer.

The second function is to define a particular set of instructions to be performed based upon the protocol type. Each type of protocol will have its own script. Types of protocols include, but are not limited to, TCP/IP, UDP/IP, BYNET lightweight datagrams, deliberate shared memory, active message handler, SCSI, and File Channel.

System Organization

Figure 5:
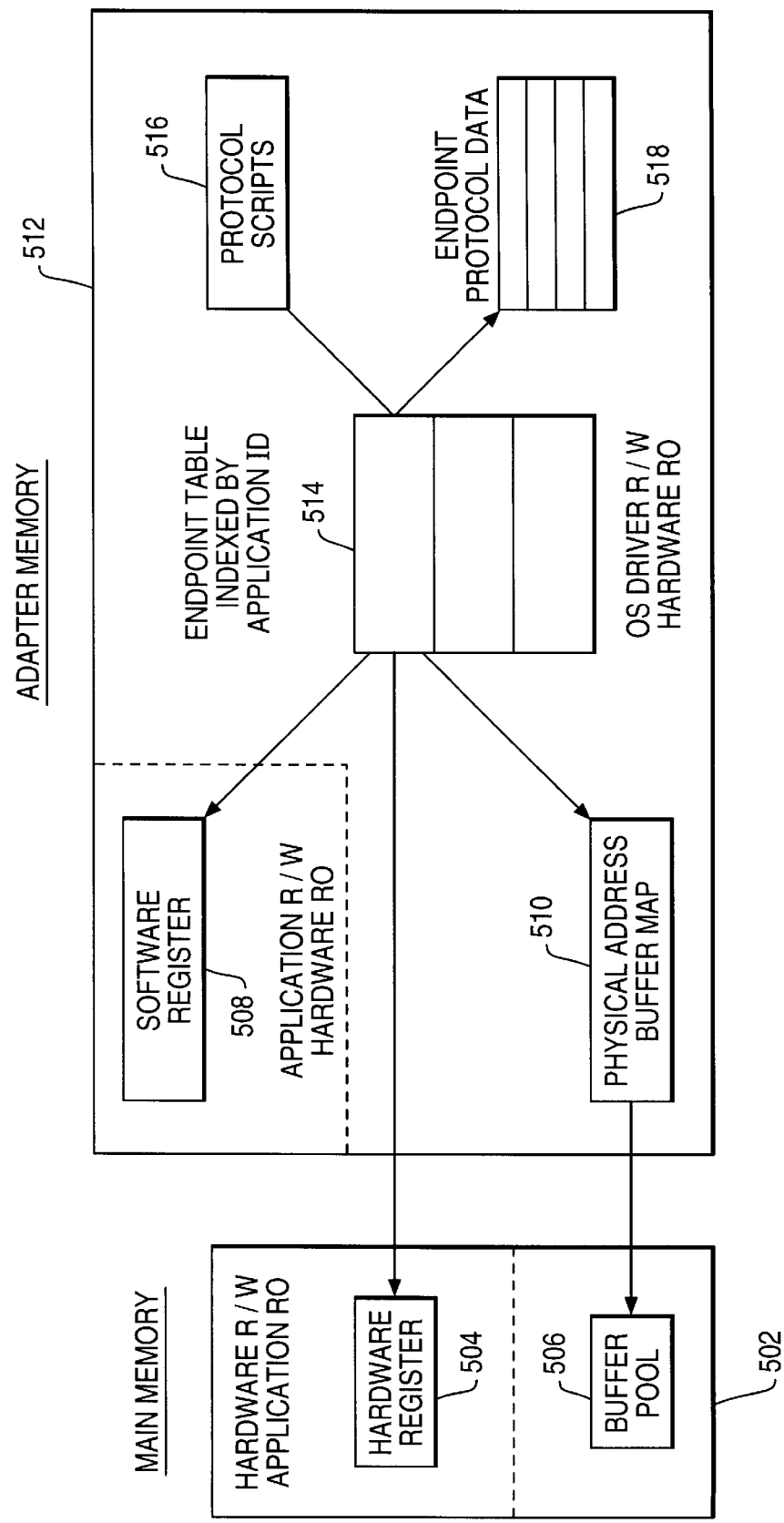
FIG. 5 is a block diagram illustrating the system organization between a main memory and an I/O device adapter memory which is compatible with the present invention.

FIG. 5 is a block diagram illustrating the system organization between a main memory and an I/O device adapter memory which is compatible with the Virtual Hardware technique. The main memory 502 implementation includes a hardware register 504 and a buffer pool 506. The I/O device adapter implementation includes a software register 508 and a physical address buffer map 510 in the adapter's memory 512. An endpoint table 514 in the memory 512 is used to organize multiple memory pages for individual user processes. Each entry within the endpoint table 514 points to various protocol data 518 in the memory 512 in order to accommodate multiple communication protocols, as well as previously defined protocol scripts 516 in the memory 512, which indicate how data or information is to be transferred from the memory 512 of the I/O device adapter to the portions of main memory 502 associated with a user process.

Typically, when a user process opens a device driver, the process specifies its type, which may include, but is not limited to, a UDP datagram, source port number, or register address. The user process also specifies either a synchronous or asynchronous connection. The device driver sets up the registers 508 and 504, endpoint table 514, and endpoint protocol data 518. The protocol script 516 is typically based upon the endpoint data type, and the endpoint protocol data 518 depends on protocol specific data.

The Virtual Hardware technique may be further enhanced by utilizing read-local, write-remote memory access. A user process typically causes a script to execute by using four virtual registers, which include STARTINGADDRESS, LENGTH, GO, and STATUS. The user process preferably first writes information into memory at the locations specified by the values in the STARTINGADDRESS and LENGTH virtual registers. Next, the user process then accesses the GO virtual register to commence execution of the script. Finally, the user process accesses or polls the STATUS virtual register to determine information about the operation or completion of this I/O request.

It will be recognized that if all four registers are located in memory on the I/O device adapter, then less than optimal performance may result if the user process frequently polls the STATUS virtual register. It is possible to improve the performance of the Virtual Hardware technique by implementing a read-local, write-remote strategy. With such a strategy, the Virtual Hardware technique stores values which are likely to be read in locations which are closest to the reading entity, whereas values which are likely to be written are stored in locations which are farthest away from the writing entity. This results in values which are likely to be read by the user process being stored in cacheable main memory, and thus minimizes the time required to access the cached values. Values which are likely to be read by the I/O device adapter are stored in the non-cacheable memory on the I/O device adapter. Thus, the registers STARTINGADDRESS, LENGTH, and GO are physically located preferably in the non-cacheable memory on the I/O adapter, whereas the STATUS register is preferably located in a page of cacheable main memory mapped into the user process' virtual address space.

UDP Datagram

FIG. 6 is a block diagram illustrating a UDP datagram 602 sent by a user process over Ethernet media. However, those skilled in the art will recognize that the Virtual Hardware technique is applicable to UDP datagrams, LAN protocols, secondary storage devices such as disks, CDROMs, and tapes, as well as other access methods or protocols.

The example of FIG. 6 shows the actual bytes of a sample UDP datagram 602 as it might be transmitted over an Ethernet media. There are four separate portions of this Ethernet packet: (1) Ethernet header 604, (2) IP header 606, (3) UDP header 608, and (4) user data 610. All of the bytes are sent contiguously over the media, with no breaks or delineation between the constituent fields, followed by sufficient pad bytes on the end of the datagram 602, if necessary.

In the Virtual Hardware technique, the access privileges given to the user processes are very narrow. Each user process has basically pre-negotiated almost everything about the datagram 602, except the actual user data 610. This means most of the fields in the three header areas 604, 606, and 608 are predetermined.

In this example, the user process and the device driver has pre-negotiated the following fields from FIG. 6: (1) Ethernet Header 604 (Target Ethernet Address, Source Ethernet Address, and Protocol Type); (2) IP Header 606 (Version, IP header Length, Service Type, Flag, Fragment Offset, Time_to_Live, IP Protocol, IP Address of Source, and IP Address of Destination); and (3) UDP Header 608 (Source Port and Destination Port). Only the shaded fields in FIG. 6, and the user data 610, need to be changed on a per-datagram basis.

To further illustrate the steps performed in accordance with the Virtual Hardware technique, assume that the user processes has initiated access to the I/O device adapter via the methods described in this disclosure. Further, assume that the user process has the user data 610 of the datagram 602 resident in its virtual address space at the locations identified by the values in the USERDATA_ADDRESS and USERDATA_LENGTH variables. Also, assume that the address for the virtual registers 210, 212, 316, 318, or 508 in the memory of the adapter are stored in the pointer "vhr_p" (Virtual Hardware remote pointer) and the address for the control information in the virtual address space of the user process 504 is stored in the pointer "vhl_p" (Virtual Hardware local pointer).

An example of user process programming that triggers the I/O device adapter is set forth below:

```
senduserdatagram(void *USERDATA_ADDRESS,
                 int USERDATA_LENGTH)
{
/* wait till adapter available */
    while (vhl_p->STATUS != IDLE) {};
    vhr_p->STARTINGADDRESS  = USERDATA_ADDRESS;
    vhr_p->LENGTH           = USERDATA_LENGTH
/* trigger adapter */
    vhr_p->GO               = 1;
/* wait till adapter completes */
    while(vhl_p->STATUS == BUSY) {};
}
```

Those skilled in the art will also recognize that the "spanking" of the vhr_p→GO register, i.e., by setting its value to 1, could be combined with the storing of the length value into the vhr_p→LENGTH register to reduce the number of I/O accesses required.

FIG. 7 is a block diagram illustrating a UDP datagram template 702 (without a user data area) residing in the I/O device adapter's memory. The user process provides the starting address and the length for the user data in its virtual address space, and then "spanks" a GO register to trigger the I/O device adapter's execution of a predetermined script. The I/O device adapter stores the user data provided by the user process in the I/O device adapter's memory, and then transmits the completed UDP datagram 702 over the media.

An example of programming that triggers the I/O device adapter is provided below:

```
udpscript(void *USERDATA_ADDRESS,
          int USERDATA_LENGTH,
          template_t *template)
{
char *physaddress;
template->IP.TotalLength = sizeof (IPHeader) +
          sizeof(UDpHeader) + USERDATA_LENGTH;
template->IP.DatagramID = nextid();
ipchecksum (template);
template->UDPLength = sizeof (UDPHeader)
          + USERDATA_LENGTH;
physaddress = vtophys(USERDATA_ADDRESS,
          USERDATA_LENGTH);
udpchecksum(physaddress, USERDATA_LENGTH, template);
}
```

The script that executes the above function provides the USERDATA_ADDRESS and USERDATA_LENGTH which the user process programmed into the adapter's memory. This information quite likely varies from datagram 602 to datagram 602. The script is also passed the appropriate datagram 702 template based on the specific software register (508 in FIG. 5 or 316 in FIG. 3). There are different scripts for different types of datagrams 702 (e.g., UDP or TCP). Also, the script would most likely make a copy of the datagram 702 template (not shown here), so that multiple datagrams 602 for the same user could be simultaneously in transit.

Within the udpscript procedure described above, the nextido function provides a monotonically increasing 16-bit counter required by the IP protocol. The ipchecksum( ) function performs a checksum for the IP Header 706 portion of the datagram 702. The vtophys( ) function performs a translation of the user-provided virtual address into a physical address usable by the adapter. In all likelihood, the adapter would have a very limited knowledge of the user process' virtual address space, probably only knowing how to map virtual-to-physical for a very limited range, maybe as small as a single page. Pages in the user process' virtual address space for such buffers would need to be fixed. The udpscript procedure would need to be enhanced if the user data were allowed to span page boundaries. The udpchecksum( ) procedure generates a checksum value for both the UDP Header 708 plus the user data (not shown).

The adapter would not want to be forced to access the user data twice over the I/O bus, once for the calculation performed by the udpchecksum( ) function, and a second time for transmission over the media. Instead, the adapter would most likely retrieve the needed user data from the user process' virtual address space using direct memory access (DMA) into the main memory over the bus and retrieving the user data into some portion of the adapter's memory, where it could be referenced more efficiently. The programming steps performed in the udpscript( ) procedure above might need to be changed to reflect that.

There are many obvious implementation choices, and the programming in the udpscript( ) procedure is not meant to be exhaustive. For example, a script could allow the user to specify a different UDP target port, or a different destination IP address. There are performance and security tradeoffs based upon the more options offered to the user process. The example given herein is intended merely to demonstrate the essence of this invention, and not to be exhaustive.

Shared Virtual Hardware

Figure 8:
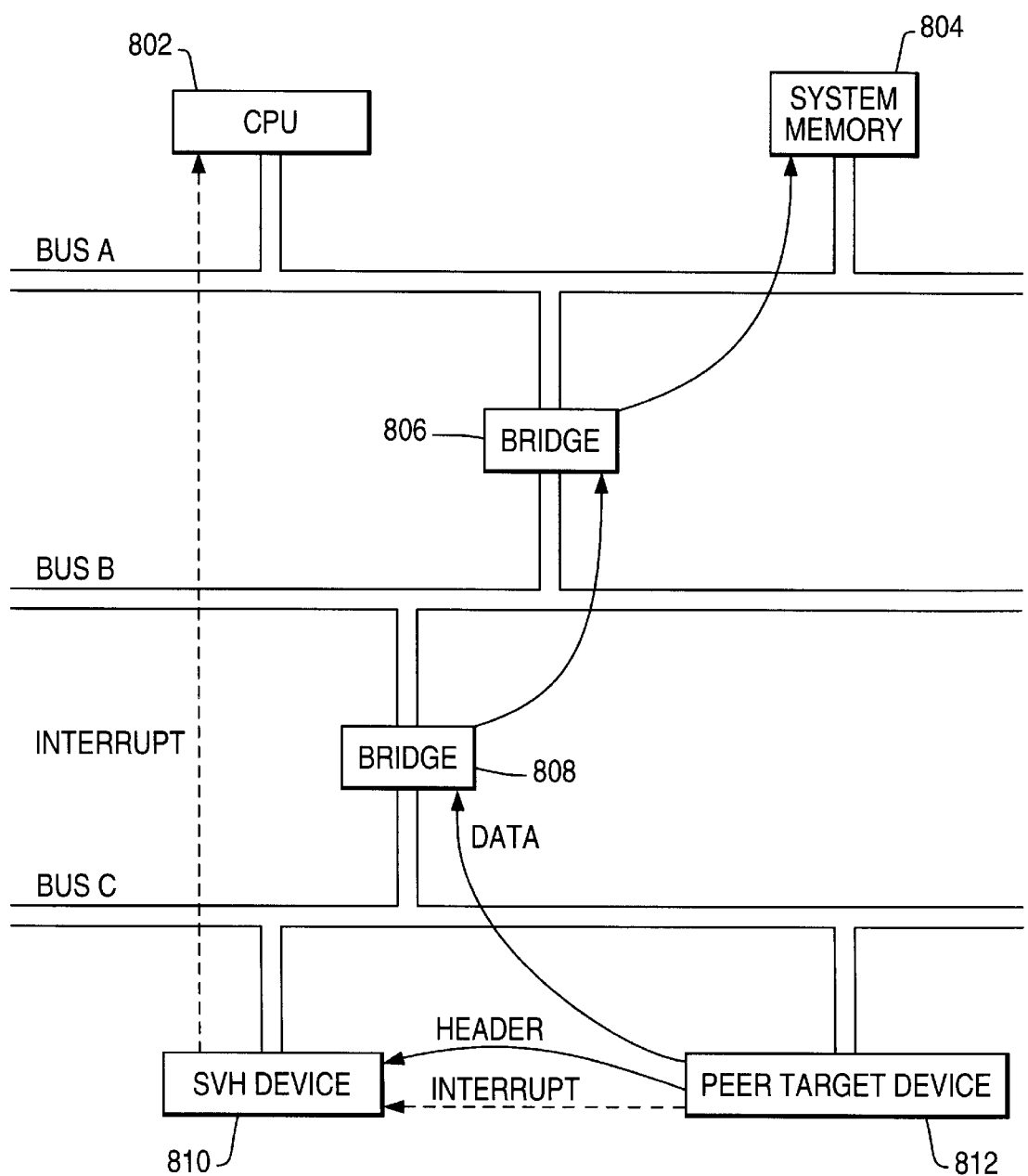
FIG. 8 is a block diagram illustrating a Shared Virtual Hardware implementation compatible with the present invention.

FIG. 8 is a block diagram illustrating a Shared Virtual Hardware implementation compatible with the present invention, wherein the exemplary hardware environment includes a CPU 802, system memory 804, bridges 806 and 808, a Shared Virtual Hardware device 810 and a peer target device 812. The Shared Virtual Hardware device 810 conforms to the Virtual Hardware technique and also provides hardware and/or software assists to the peer target device 812 that does not conform to the Virtual Hardware technique. In essence, the Shared Virtual Hardware device 810 extends the Virtual Hardware technique by incorporating additional capability in order to share the Virtual Hardware functionality with the peer target device 812 that does not itself support the Virtual Hardware technique. Therefore, the Shared Virtual Hardware device 810 can provide significant performance enhancements to a "dumb" or off-the-shelf, peer target device 812.

In addition, user processes executed by the CPU 802 interacting with the peer target device 812 can benefit from the Shared Virtual Hardware technique. In addition, the system bandwidth requirements for the control of the peer target device 812 may be reduced as the controlling element, i.e., the Shared Virtual Hardware device 810, moves closer in proximity to the peer target device 812 in multi-tiered bus structures (as compared to the CPU 802 which normally controls the peer target device 812).

In the present invention, data structure usage and functionality located on the Virtual Hardware device 810 and the system memory 804 is extended to provide the additional functionality required for the Shared Virtual Hardware technique. The Shared Virtual Hardware device 810 has the capability to associate data structures in the system memory 804 to both the peer target device 812 and itself.

The Shared Virtual Hardware technique maps a portion of memory physically located on the peer target device 812 into its local memory and into the system memory 804. Sub-portions or pages of the system memory 804 are mapped into the address spaces for one or more user processes executed by the CPU 802, thereby allowing the user processes to directly program the peer target device 812 via the Shared Virtual Hardware device 810. The Shared Virtual Hardware device 810 subsequently snoops the address spaces for the user processes to detect any reads or writes thereto. If a read or write is detected, the Shared Virtual Hardware device 810 performs a specific predefined script of actions, frequently resulting in an I/O operation being performed directly between the user process' address space in the system memory 804 and the peer target device 812, which I/O operation is mediated by the Shared Virtual Hardware device 810. The user process triggers the execution of the script by setting or "spanking" control registers in its address space in the system memory 804, which in turn causes the execution of the script.

The data structures maintained in the system memory 804 and the local memory of the Shared Virtual Hardware device 810 include: (a) buffer descriptors which are initialized to link the user process data and header buffer pointers to the Shared Virtual Hardware device 810; and (b) endpoint descriptor buffers which link an endpoint (user process) to a set of buffer descriptors and the physical layer endpoint protocol. This information enables the Shared Virtual Hardware device 810 to associate a physical layer endpoint identifier (as defined by the physical layer protocol) directly to a user process buffer (in the system memory 804). In addition, the data structures enable the Shared Virtual Hardware device 810 to link the user process buffer directly to the physical layer endpoint identifier of the peer target device 812.

The Shared Virtual Hardware device 810 is also able to directly control the peer target device 812. The control requirements are similar to those required locally on the Shared Virtual Hardware device 810. The main difference is that the control occurs through the upstream bus as opposed to the downstream (local) bus.

Control functions include a number of operations. For inbound operations, header or partial header acquisition is performed by the Shared Virtual Hardware device 810 for endpoint identification, rather than the peer target device 812. Further, data transfer control is performed by the user process executed by the CPU 802, rather than the peer target device 812.

For outbound operations, header and data transfer control is controlled from the CPU 802. Other control operations may include status acquisition.

The Shared Virtual Hardware device 810 includes functionality that allows it to address the peer target device 812. Further, the peer target device 812 routes interrupts that are normally directed to the CPU 802 are instead directed to the Shared Virtual Hardware device 810. This is generally accomplished via a direct, asynchronous interrupt or a synchronous write from the peer target device 812.

The Shared Virtual Hardware device 810 is also able to detect and identify the interrupt generated at the peer target device 812. For example, a dedicated interrupt signal line between the two devices 810 and 812 may be used for this purpose. The Shared Virtual Hardware device 810 responds to the interrupt in the same manner as is required for the local response.

For optimal flexibility, the Shared Virtual Hardware device 810 is able to distinguish between DAI and non-DAI (standard protocols) applications and support both. The determination of this mode are usually made through polling of data structures which have been initialized to indicate the mode of operation, or may be determined from default settings where there is no associated data structures found.

Therefore, for Shared Virtual Hardware functionality, non-DAI applications require that the Shared Virtual Hardware device 810 allow the interrupt generated by the peer target device 812 to be redirected or steered to the main node controller.

Conclusion

In summary, the present invention discloses a method of using virtual registers to directly control an I/O device adapter to facilitate fast data transfers. The method initializes a socket endpoint for a virtual register memory connection within an I/O adapter's main memory. Incoming data is then written to the virtual memory and detected by polling or "snooping" hardware. The snooping hardware, after detecting the write to virtual registers, generates an exception for the system bus controller. The bus controller then transfers the data to the I/O device adapter and initiates the registers of the I/O device adapter to execute a predetermined script to process the data.

The preferred embodiment of the present invention typically implements logic on the I/O device adapter to translate a read or write operation to a single memory address so that it causes the execution of a predetermined script. Such a script may also be dynamically modified to accommodate environment characteristics such as the memory location or the size of the I/O device adapter's address space.

It will be recognized by those skilled in the art that using the Virtual Hardware implementation of the present invention does not preclude a user process from simultaneously using a standard device driver on the same I/O device adapter. That is, a user process can use the Virtual Hardware of the present invention to provide a direct streamlined path to a given I/O device adapter, while standard slower access to the I/O device adapter is concurrently provided to other user processes within the same system by normal streams or other device drivers.

Those skilled in the art will also recognize that the present invention is applicable to any I/O device adapter that has a memory and is not limited to network adapters. The application cited in the present specification is for illustrative purposes only and is not intended to be exhaustive or to limit the invention to the precise form disclosed.

In addition, those skilled in the art will recognize that the present invention is applicable to systems with different configurations of devices and components. The example configurations of devices and components cited in the present specification are provided for illustration only.

In conclusion, the foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of controlling a plurality of input/output (I/O) devices connected to a computer, comprising the steps of:
   (a) creating an address space for a first I/O device in a memory of the computer, wherein the address space for the first I/O device is snooped by a second I/O device;
   (b) reading and writing data into the snooped address space for the first I/O device, wherein the second I/O device detects the reading and writing of the data into the snooped address space for the first I/O device; and
   (c) triggering a predefined sequence of actions in the second I/O device by programming specified values into the data written into the snooped address space for the first I/O device, wherein the predefined sequence of actions interact with the first I/O device.

2. The method of claim 1 above, further comprising the step of creating an address space for the second I/O device in the memory of the computer, wherein the address space for the second I/O device is snooped by a second I/O device.

3. The method of claim 2 above, further comprising the step of reading and writing data into the snooped address space for the second I/O device, wherein the second I/O device detects the reading and writing of the data into the snooped address space for the second I/O device.

4. The method of claim 3 above, further comprising the step of triggering a predefined sequence of actions in the second I/O device by programming specified values into the data written into the snooped address space for the second I/O device.

5. The method of claim 1 above, further comprising the step of mapping at least a portion of the first I/O device's memory into the address space for the first I/O device in the memory of the computer.

6. The method of claim 5 above, wherein the mapping step further comprises the step of mapping one or more pages of the first I/O device's memory into the address space for the first I/O device in the memory in the computer.

7. The method of claim 5 above, further comprising the step of securing the mapped portion of the memory from all other processes executed by the computer.

8. The method of claim 1 above, wherein the predefined sequence of actions is represented by a script.

9. The method of claim 1 above, wherein the triggering step further comprises the step of the triggering the predefined sequence of actions in the second I/O device by programming specified values into the data written into the snooped address space for the first I/O device, wherein the specified values are stored into control registers in the second I/O device.

10. An apparatus for controlling a plurality of input/output (I/O) devices connected to a computer, comprising:
    (a) means for creating an address space for a first I/O device in a memory of the computer, wherein the address space for the first I/O device is snooped by a second I/O device;
    (b) means for reading and writing data into the snooped address space for the first I/O device, wherein the second I/O device detects the reading and writing of the data into the snooped address space for the first I/O device; and
    (c) means for triggering a predefined sequence of actions in the second I/O device by programming specified values into the data written into the snooped address space for the first I/O device, wherein the predefined sequence of actions interact with the first I/O device.

11. An apparatus for controlling a plurality of input/output (I/O) devices connected to a computer, comprising:
    (a) a processor having a memory, first I/O device, and second I/O device coupled thereto;
    (b) means, performed by the processor, for creating an address space for the first I/O device in the memory, and for reading and writing data into the address space for the first I/O device; and
    (c) means, performed by the second I/O device, for detecting the reading and writing of the data into the address space for the first I/O device, and for triggering a predefined sequence of actions in response thereto.

12. The apparatus of claim 10 above, further comprising means for creating an address space for the second I/O device in the memory of the computer, wherein the address space for the second I/O device is snooped by a second I/O device.

13. The apparatus of claim 12 above, further comprising means for reading and writing data into the snooped address space for the second I/O device, wherein the second I/O device detects the reading and writing of the data into the snooped address space for the second I/O device.

14. The apparatus of claim 13 above, further comprising means for triggering a predefined sequence of actions in the second I/O device by programming specified values into the data written into the snooped address space for the second I/O device.

15. The apparatus of claim 10 above, further comprising means for mapping at least a portion of the first I/O device's memory into the address space for the first I/O device in the memory of the computer.

16. The apparatus of claim 15 above, wherein the means for mapping further comprises means for mapping one or more pages of the first I/O device's memory into the address space for the first I/O device in the memory in the computer.

17. The apparatus of claim 15 above, further comprising means for securing the mapped portion of the memory from all other processes executed by the computer.

18. The apparatus of claim 10 above, wherein the predefined sequence of actions is represented by a script.

19. The apparatus of claim 10 above, wherein the means for triggering further comprises means for the triggering the predefined sequence of actions in the second I/O device by programming specified values into the data written into the snooped address space for the first I/O device, wherein the specified values are stored into control registers in the second I/O device.

20. The apparatus of claim 11 above, further comprising means for creating an address space for the second I/O device in the memory of the computer, wherein the address space for the second I/O device is snooped by a second I/O device.

21. The apparatus of claim 20 above, further comprising means for reading and writing data into the snooped address space for the second I/O device, wherein the second I/O device detects the reading and writing of the data into the snooped address space for the second I/O device.

22. The apparatus of claim 21 above, further comprising means for triggering a predefined sequence of actions in the second I/O device by programming specified values into the data written into the snooped address space for the second I/O device.

23. The apparatus of claim 11 above, further comprising means for mapping at least a portion of the first I/O device's memory into the address space for the first I/O device in the memory of the computer.

24. The apparatus of claim 23 above, wherein the means for mapping further comprises means for mapping one or more pages of the first I/O device's memory into the address space for the first I/O device in the memory in the computer.

25. The apparatus of claim 23 above, further comprising means for securing the mapped portion of the memory from all other processes executed by the computer.

26. The apparatus of claim 11 above, wherein the predefined sequence of actions is represented by a script.

27. The apparatus of claim 11 above, wherein the means for triggering further comprises means for the triggering the predefined sequence of actions in the second I/O device by programming specified values into the data written into the snooped address space for the first I/O device, wherein the specified values are stored into control registers in the second I/O device.

* * * * *